United States Patent [19]

Marko et al.

[11] Patent Number: 5,402,448
[45] Date of Patent: Mar. 28, 1995

[54] BURST MODE RECEIVER CONTROL

[75] Inventors: Paul D. Marko, Ft. Lauderdale; David L. Brown, Miami; Jaime A. Borras, Hialeah; Ronald E. Sharp, Plantation, all of Fla.

[73] Assignee: Motorola Inc., Schaumburg, Ill.

[21] Appl. No.: 194,760

[22] Filed: Feb. 10, 1994

Related U.S. Application Data

[62] Division of Ser. No. 750,373, Aug. 27, 1991.

[51] Int. Cl.$^6$ .............................................. H03D 1/00
[52] U.S. Cl. ................................... 375/340; 375/376; 370/105.1
[58] Field of Search ............... 375/94, 114, 120, 81, 375/80, 106; 370/105.1, 106

[56] References Cited

U.S. PATENT DOCUMENTS

| | | | |
|---|---|---|---|
| 4,128,809 | 12/1978 | Kage | 325/324 |
| 4,215,239 | 7/1980 | Gordy et al. | 375/97 |
| 4,243,941 | 1/1981 | Zdunek | 375/81 |
| 4,400,817 | 8/1983 | Sumner | 375/119 |
| 4,575,863 | 3/1986 | Butcher et al. | 375/114 |
| 4,625,320 | 11/1986 | Butcher | 375/76 |
| 4,667,333 | 5/1987 | Butcher | 375/106 |
| 4,744,095 | 5/1988 | Cornet et al | 375/100 |
| 4,757,502 | 7/1988 | Meuriche et al. | 370/104 |
| 4,821,292 | 4/1989 | Childress | 375/76 |
| 4,829,594 | 5/1989 | Heck et al; | 455/334 |
| 4,953,185 | 8/1990 | Goode | 375/106 |
| 5,027,352 | 6/1991 | Goode | 370/110.1 |
| 5,065,107 | 11/1991 | Cumer et al. | 375/97 |
| 5,109,392 | 4/1992 | McDonald | 375/85 |
| 5,181,227 | 1/1993 | Deluca et al. | 375/95 |
| 5,182,761 | 1/1993 | Beyer et al. | 375/119 |
| 5,222,253 | 6/1993 | Heck | 455/78 |

Primary Examiner—Stephen Chin
Assistant Examiner—T. Ghebretinsae
Attorney, Agent, or Firm—Pedro P. Hernandez; Daniel K. Nichols

[57] ABSTRACT

A transceiver (100) is provided for transmitting during the transmission bursts (12) of a frame and receiving during the receiving time-slot windows (14). The transceiver (100) includes a receiver (320) for receiving a repeating radio frequency data (16) signal at any time within the receiving time-slot window (14) and for demodulating the repeating radio frequency data signal down to a baseband data signal. A data detector and clock recovery device (330) recovers the valid data (CHMP) from the baseband data signal. For controlling the receiver (320) and data detector and clock recovery device (330), a control circuit (400) modifies the receiving time-slot windows (14) to only receive and detect when valid data is expected (52).

2 Claims, 6 Drawing Sheets

BURST MODE RECEIVER CONTROL

This is a divisional of pending application Ser. No. 07/750,373, filed Aug. 27, 1991.

TECHNICAL FIELD

This invention relates generally to the field of portable or cordless telephones systems and more specifically to the synchronization of the cordless handset or radio telephones to the base transceiver of these systems before receiving and detecting valid data.

BACKGROUND

A portable telephone system, such as the second-generation digital cordless telephony (CT2), has multiple transceivers which are located at a call point station or public base station known as a telepoint. These transceivers allow persons using portable telephones or cordless handsets to access the public telephone network when in range or within a service area after the cordless handset has established an asynchronous link with the base system.

In the CT2 system, the cordless handset initiating a call, asynchronously transmits on one available channel of the handset's transceiver which corresponds to a transceiver radio frequency (RF) channel of the base.

According to one protocol out of other applicable protocols, called multiplex 3 (MUX3) of the CT2 specification, the channel used by the cordless handset is first divided in the time domain into 7 frames, F1–F7, as illustrated in FIG. 1a. Accordingly, the cordless handset transmits continuously for five frames or transmission bursts of ten milliseconds and the receiver receives for four milliseconds in a receiving time-slot window, when the transmitter is turned off for two frames. Within the ten milliseconds of transmit time comprising 5 frames, the information is repeated four times (in each submux) within a two millisecond frame, as seen in FIG. 2.

A typical layout of the MUX3 format in a sequential order of the frames is shown in FIG. 2. The labels F1 through F7, respectively, indicate frame numbers. The period of a single frame is two milliseconds. Referring to both FIG. 1b and 2, each frame, F1-F7, is divided into four smaller subframes s1-s4 containing differently sized data (D) or frame synchronization words (CHMP), each preceded by a different number of preamble bits (P). The entire synchronization and data information of the repeating data signal 16 is then repeated four times in each of the four subframes s1-s4.

All the subframes, where the complete information is periodically provided once, are grouped together to form a submultiplex or submux 40. Each frame thus consists of four submuxes 40, corresponding to the subframes s1-s4. Within each submux 40, a D channel synchronization character (SYNCD), 3 address code words (ACW), and a frame synchronization character of twenty-four bits (CH MP) exist. Each of these information words are preceded by some number of preamble bits. The D channel synchronization character (SYNCD) precedes and are grouped with the address code word (ACW) to form the D channel data. All of the D channel data are subdivided into separate data words of ten bits each. Thus, every twenty bits of the D channel data are repeated in each of the four submuxes 40 before the D channel data changes.

Each subframe or submux consists of thirty-six bits, in a row. Thus within the subframe or submux s1 of frame 1 (F1), the first bit is reserved for the first bit a 6 bit preamble word of the first SYNCD 10bit data word. An 8 bit preamble word precedes the second 10 bits SYNCD data word. Finally, the first two bits of the 8 bit preamble word of the next 10 bit SYNCD data word ends the first row of the first submux or subframe s1. The rest of the D channel data are arranged accordingly, as seen in FIG. 2.

On the other hand, within any of the submuxes or subframes of frame 5 (F5), the 24 bit frame synchronization character (CHMP) is preceded by a 12 bit preamble word. Because a smaller number of preamble bits (P) precedes the D channel data (D) than the frame synchronization character (CHMP), the frame synchronization character (CHMP) is misaligned with and lags the D channel data (D).

As is known, the preamble bits are used to first synchronize an internal clock of each receiver of the base transceiver to that of the received signal from the cordless handset so that subsequent proper decoding of the synchronization code may be achieved. Even though the frame synchronization character (CHMP) occurs at the end of the transmission burst, the frame synchronization character usually needs to be detected first since it denotes the start of important information and has a low probability of falsing.

On the other end as seen in FIG. 1b, the base station asynchronously receives (14) and transmits (12) alternately for one millisecond in a time domain duplex (TDD) burst mode, after a synchronous link has been established with another CT-2 protocol MUX1 or MUX2. While scanning through the different radio frequencies of its transceivers, the base station looks for the presence of a synchronization signal (i.e. the frame synchronization character CHMP) to determine if that channel or frequency is used by a handset in a call attempt.

Hence, after synchronizing the internal clock of the base to the cordless handset by synchronizing to the preamble bits of the frame synchronization character CHMP and validating future data by correlating the correct frame synchronization character CHMP, the base may activate its receiver to periodically start the receive window to align to the remaining D channel information or data (D) according to at the point where the incoming frame synchronization character was received. However, portions of the data words would be lost at the beginning of this receive window due to the misalignment of the start of the frame synchronization character (CHMP) and the D channel data (D).

Furthermore, slight phase differences between the transmit frame of the cordless handset and the receive window of the base station can cause further misalignment. This misalignment eventually results in the receiver of the base station receiving the frame synchronization character too early in the received window, as discussed previously. On the other hand, the frame synchronization character can be received too late as to where the last bits of the incoming frame containing the synchronization character CHMP is received at the antenna of the base station but lost at the beginning of a new transmit burst due to the internal propagation delay of the receiver.

Since the base receive window of one millisecond can fit up to two submuxes as seen in FIG. 1b, the duplicative information in the submuxes can corrupt, needlessly, the operation of AGC receiver, such as a zero intermediate frequency (ZIF) receiver disclosed in a co-pending U.S. patent application No. 7/574,628 and incorporated herein by reference. For example, if the signal is strong, the falsing rate in an AGC receiver may be high due to a need for AGC re-acquisition or stabilization, after the AGC has been discharged during the time when valid data is not present. Accordingly, there exists a need to provide a reliable method of receiving asynchronous data in a multitransceiver synchronous burst mode system while optimizing the operation of the receiving circuits of the base transceiver which includes both the receiver and detector.

SUMMARY OF THE INVENTION

Briefly, according to the invention, there is provided a transceiver for transmitting during the transmission time slot window of a frame and receiving during the receiving time-slot windows. The transceiver includes a receiver for receiving a repeating radio frequency data signal at any time within the receiving time-slot window and for demodulating the repeating radio frequency data signal down to a baseband data signal. A data detector and clock recovery device recovers the valid data from the baseband data signal. For controlling the receiver and data detector clock recovery device, a control circuit modifies the receiving time-slot windows to only receive and detect when valid data is expected.

DETAILED DESCRIPTION OF THE PREFERRED EMBODIMENT

Figure 1A:
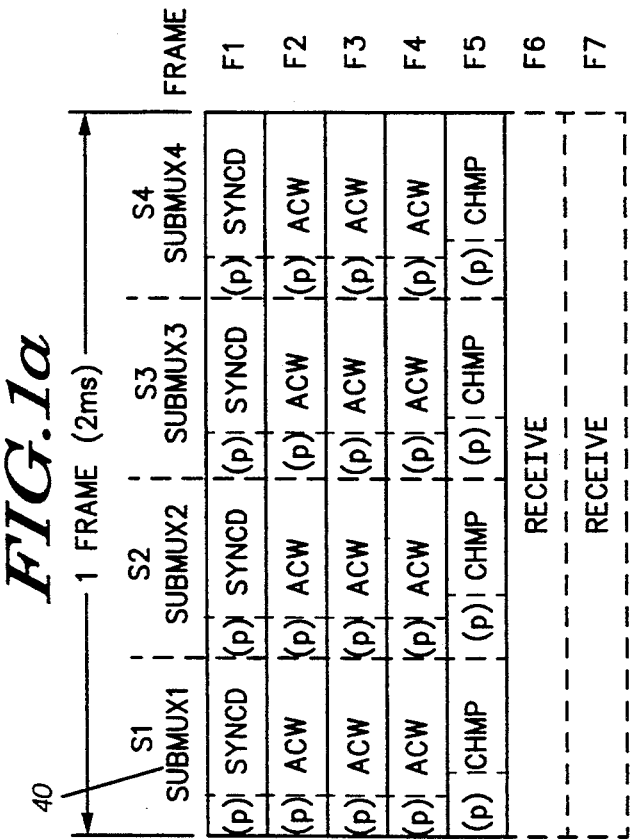
FIG. 1a-b is a protocol of a CT2 MUX3 system.
Figure 1B:
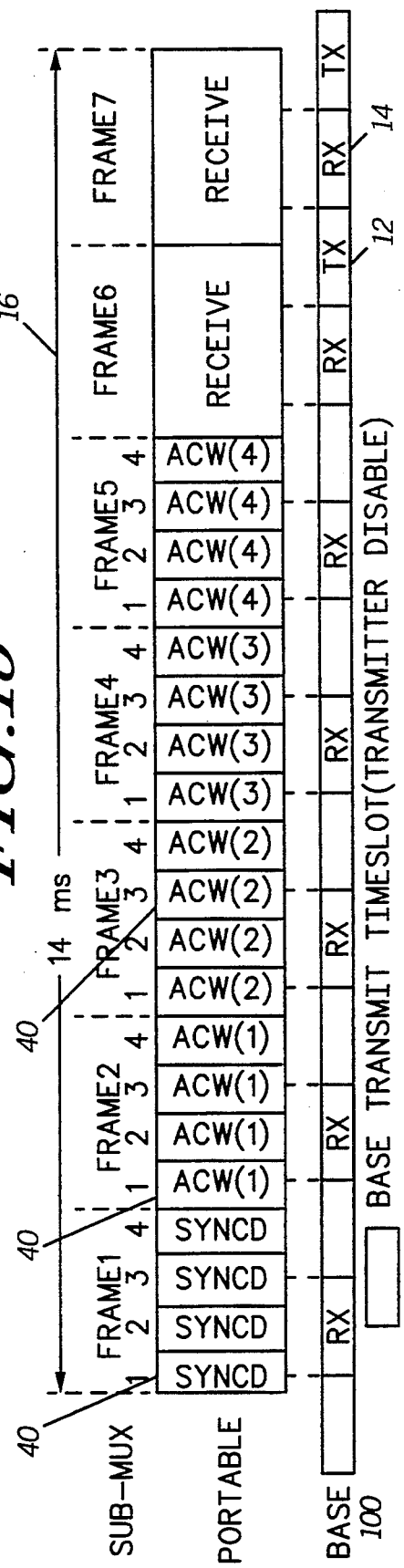
Figure 2:
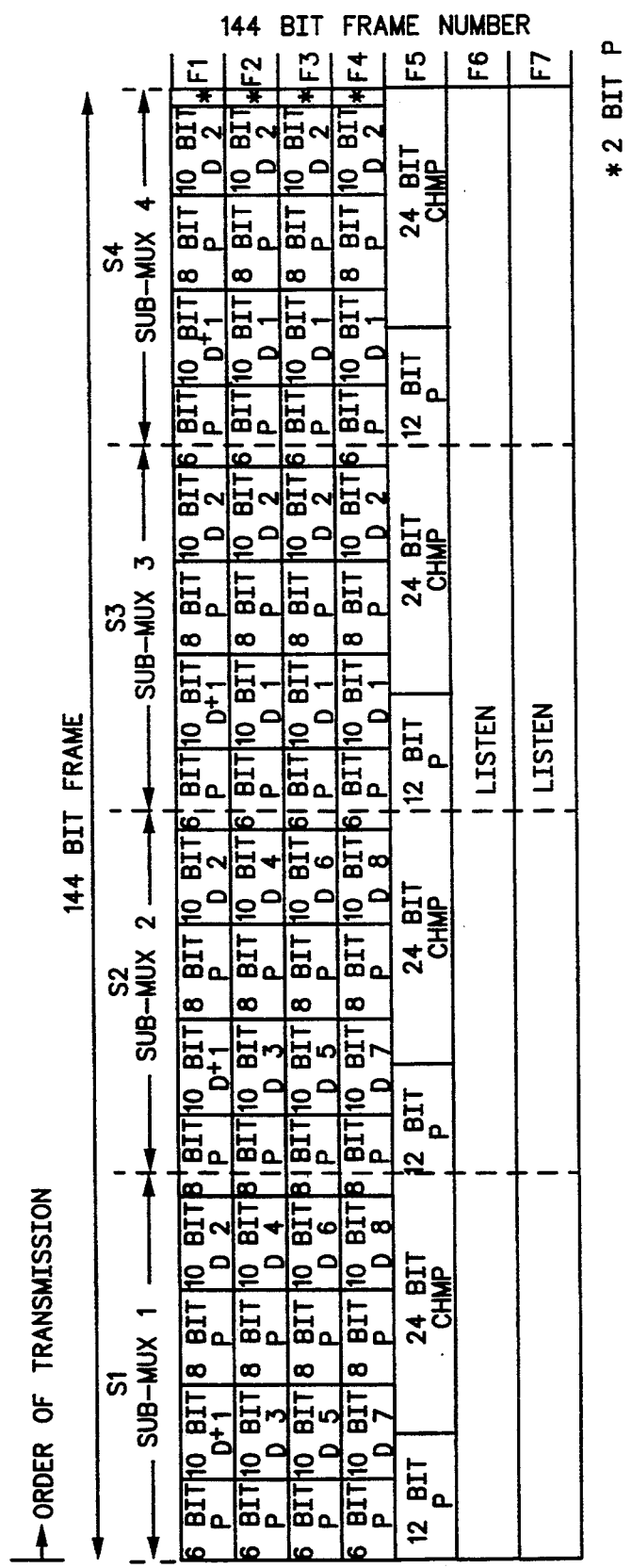
FIG. 2 is a typical layout of a MUX3 format of FIG. 1.
Figure 3:
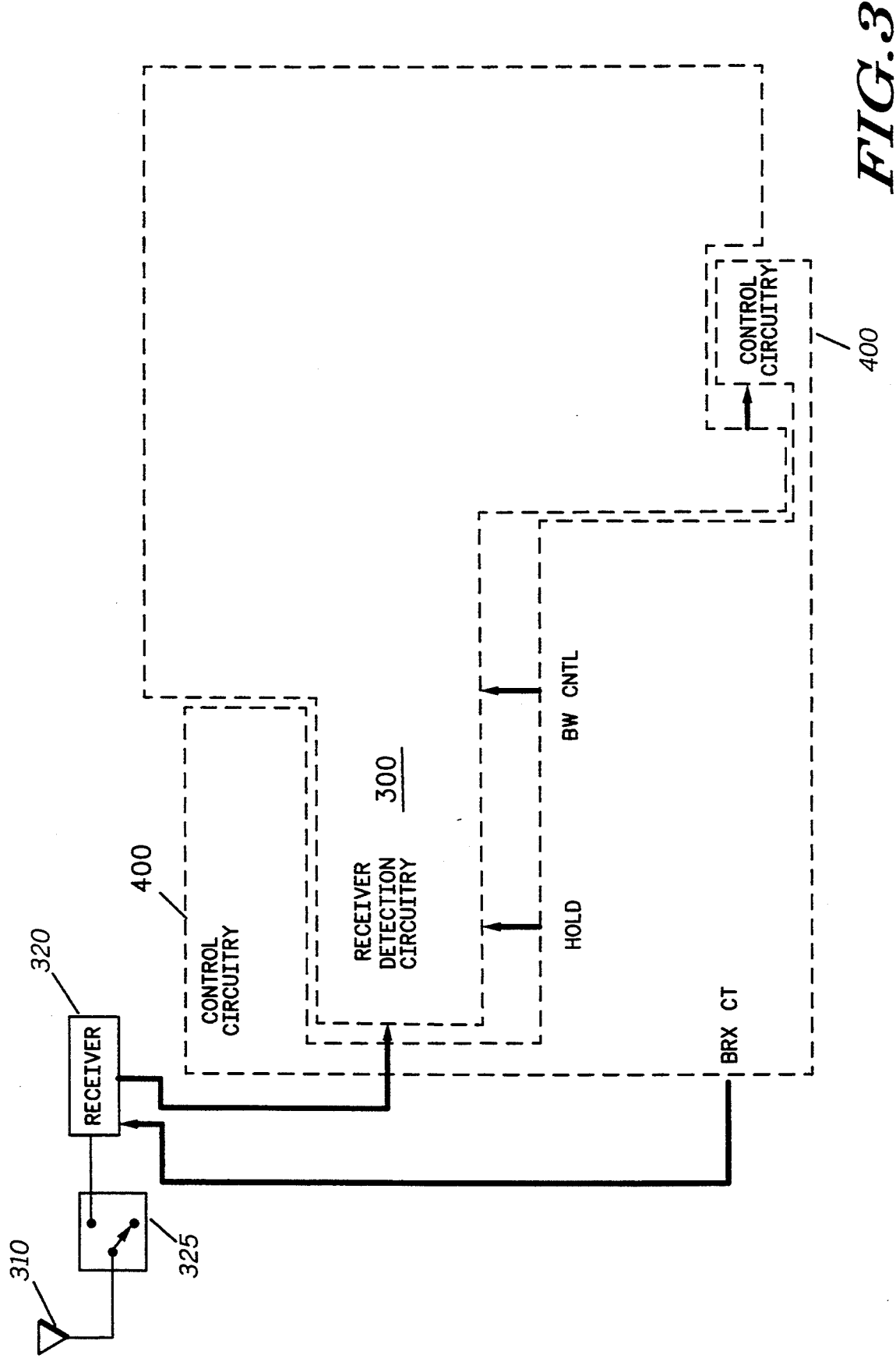
FIG. 3 is a block diagram of a receiver section of a base transceiver in accordance with the present invention.

Referring to FIGS. 3-6, the receiving section of a base transceiver comprises a radio frequency (RF) receiver 320, a receive detection circuitry 300, and a control circuitry 400. The receive detection circuitry 300 comprises a data detector and clock recovery device 330, a D channel data buffer 340, a B channel voice buffer 341, a frame sync detector 350, and a receiver bit counter 360. The control circuitry 400 includes a delay circuit 402, a receive mask delay circuit 404, two multiplexers 421,422, three AND gates 431,432, and 433, two OR gates 423, 429, nine transmission gate switches 441-449, a R-S Flip-Flop 462, and a receive decoder 370. Basically, the control circuitry 400 controls when the RF radio receiver 320 is enabled to receive the RF frequency containing the incoming signal as well as when the receive detection circuitry 300 is to interpret the information received.

A radio frequency RF repeating data signal, such as of the MUX3 protocol or any other suitable burst signal, is received at an antenna 31 0 and fed to the receiver 320 via an antenna switch 325 controlled by a transceiver receive control signal RX CNTL which enables the antenna of this receiver 320 and all other receivers of different transceivers at the base station. Prior to the present invention, this signal also activated and deactivated the receiver 320. The receiver 320 receives and demodulates the RF carrier signal down to baseband data.

Figure 5:
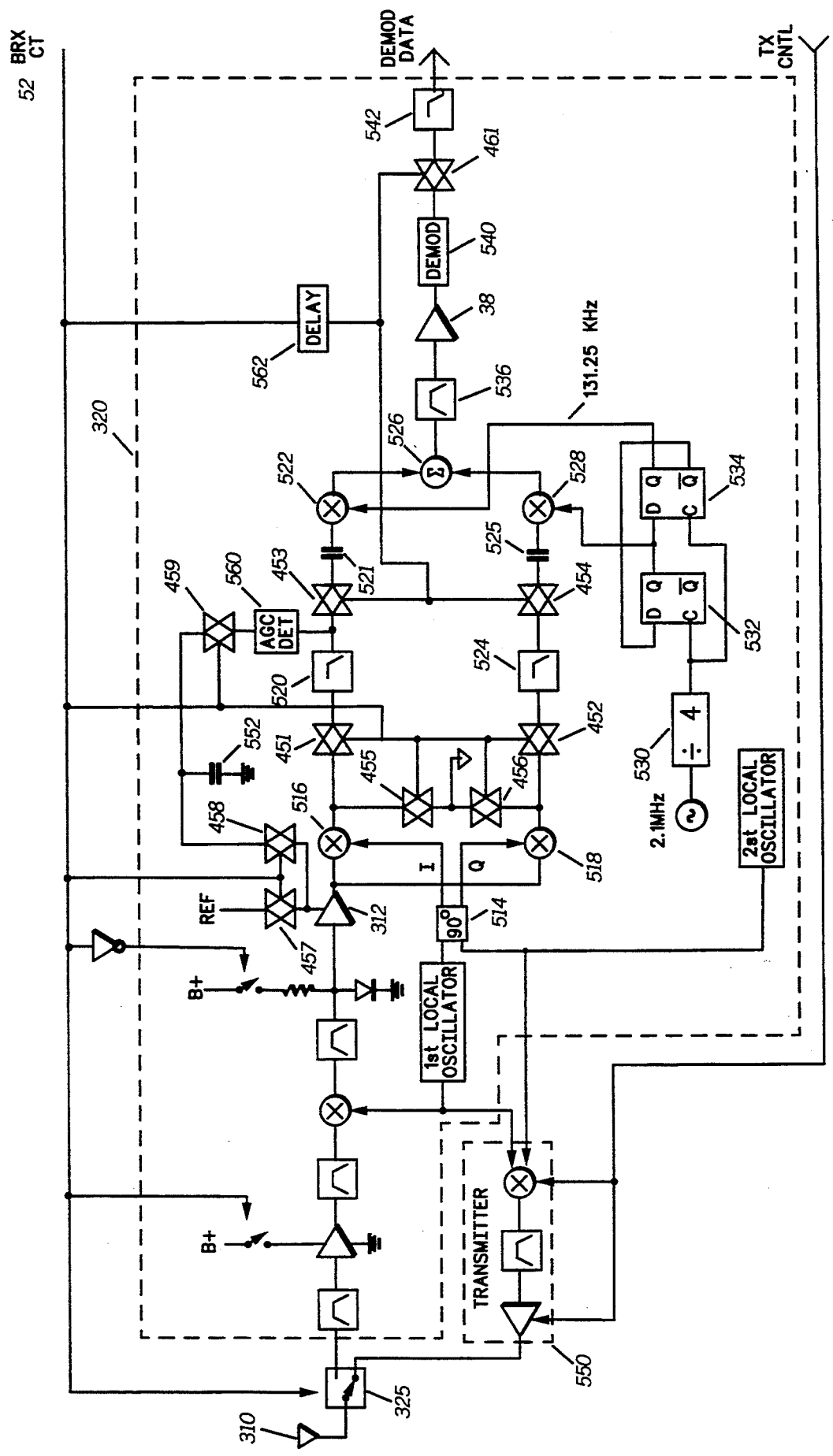
FIG. 5 is a block diagram of the receiver 320 of FIG. 3 in more detail.
Figure 6:
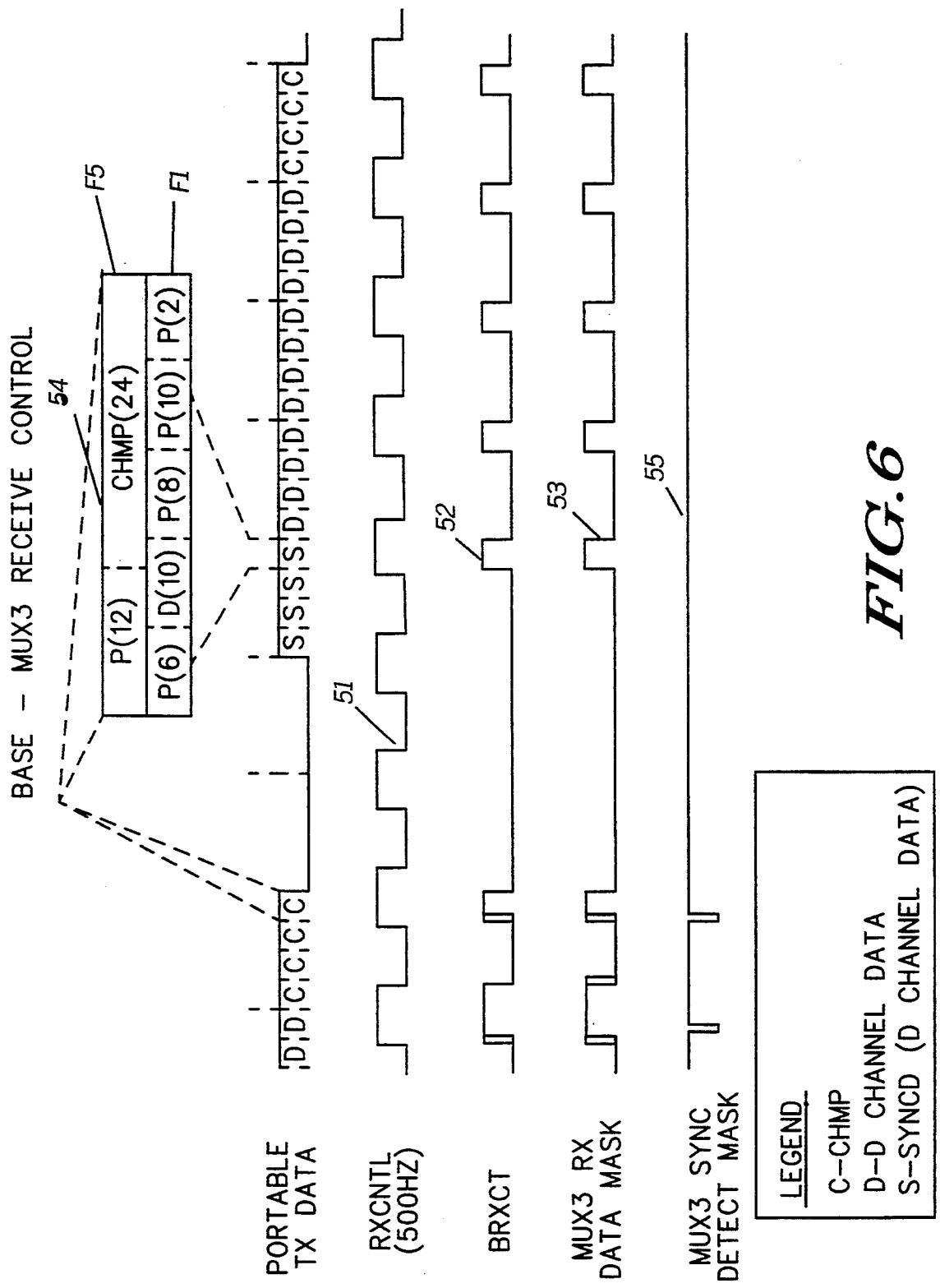
FIG. 6 is a timing diagram illustrating the timing of some of the signals denoted in FIGS. 3-5.

Referring to FIG. 5, there is shown a block diagram of an exemplary AGC receiver such as a zero IF receiver 320. A preamplifier 31 2 receives a radio-frequency (RF) or IF input signal, which it amplifies and applies to down-mixers 516 and 518. A phase-shifting circuit 514 receives a local oscillator (L.O.) waveform and produces an inphase waveform (I) and a quadrature waveform (Q) in response to the L.O. waveform. The I and Q signals are applied to down mixers 516 and 518 for multiplication with the input signal. The down mixers 516 and 518 convert the signal from the RF or IF to baseband frequency. Lowpass filters 520 and 524 filter the baseband signals to remove interference and limit the noise bandwidth of the receiver 320. Lowpass filters 520 and 524 are coupled to a pair of up conversion mixers 522 and 528 through coupling capacitors 521 and 525. Up mixers 522 and 528 then convert the baseband signals up to a convenient frequency for further processing and demodulation. Inphase and quadrature reference signals (having a frequency of 131.25 kHz, for example) for mixing by the up mixers 522 and 528 are provided by a network that includes a divide-by-four divider 530, and two "D" flip flops 532 and 534. The "Q" output of flip flop 532 is applied to mixer 528, and the "Q(bar)" output of flip flop 534 is applied to the mixer 522. An adder 526 combines the signal produced by the up mixer 522 with the signal produced by the up mixer 528. A bandpass filter 536 (e.g., a 2-pole filter with a nominal bandwidth somewhat greater than twice the baseband filter bandwidth) filters the signal produced by the adder 526, and produces a signal having a frequency of 131.2785 kHz (in this example). A limiter 538 limits the signal produced by the filter 536 for demodulation by a demodulator 540. A post-demodulator filter 542 filters the demodulated signal before presentation to a listener.

It is noted that the receiver 320 utilizes automatic gain control (AGC) such that subsequent signal levels are compatible with later used devices (for example, such that the signal levels present at the output of an AGC amplifier 312 fall within the dynamic range of the baseband filters 520 and 524 and demodulator 540 used in an AGC receiver such as a zero IF receiver 320).

Figure 4:
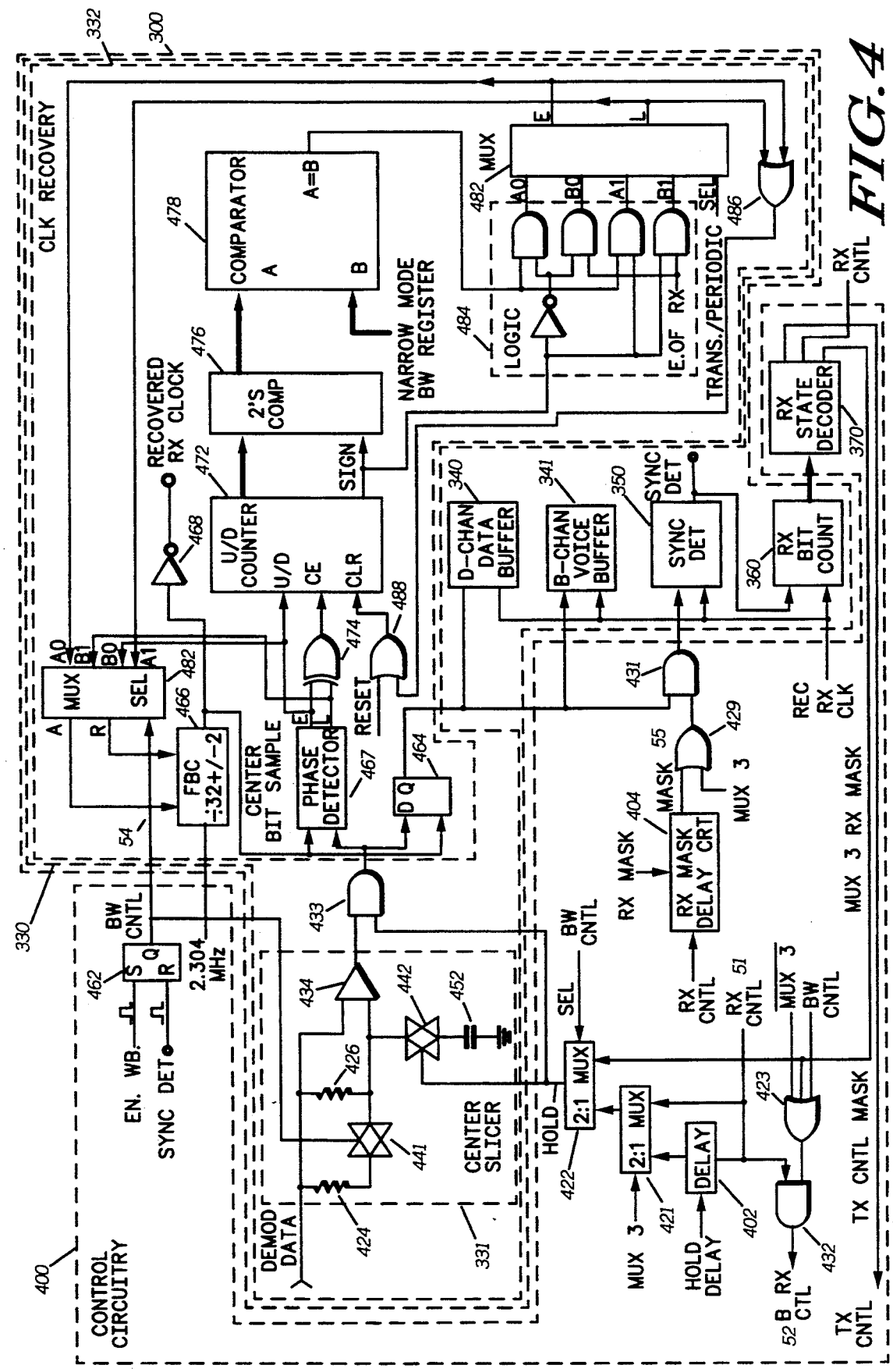
FIG. 4 is a block diagram of the data detector and clock recovery device 330 of FIG. 3 in more detail.

Referring to FIG. 4, the data detector portion of the device 330, comprising a comparator-RC network or center slicer 331, converts the analog demodulated data from the radio receiver or discriminator 320 into digital data or limited data. When the third AND gate 433 is enabled (by a high signal on a second input of the AND gate 433), the clock signal is recovered from the limited data provided (to a first input of the AND gate 433) within the data detector and clock recovery device 330 by a digital phase locked loop DPLL or dual bandwidth clock recovery device 332. Such a digital phase locked loop is synchronized to the bit transitions of the preamble of the digital signal or demodulated signal. The clock recovery portion inside the data detector and clock recovery device 330 is thus provided with an internal clock or digital phase locked loop 332 that runs on a frequency which is a multiple of the expected incoming bit stream or preamble bits and is digitally phase locked to the incoming data.

To demultiplex data from the digital signal, the limited data from the data detector portion of the device 330 or the center slicer 331 is also provided to the B (341) and D (340) channel buffers. The B and D channel buffers 340 and 341 steer the incoming data to the proper circuits (not shown) such as voice and system control information processing circuits.

To look for the frame sync marker or the frame synchronization character CHMP in the received signal by sampling the data, the frame sync detector 350 receives limited data (from the output of the center slicer 331) and the recovered clock (from the DPLL 332 of the data detector and clock recovery device 330). The frame sync detector 350 recognizes the particular pattern of the frame characterization word CHMP that identifies the presence of other information such as the D channel data bits. In this manner, the frame sync detector 350 determines when valid data has been received as evidenced by the reception of the correct frame synchronization character CHMP.

Upon detection of the frame synchronization word (CHMP), signifying more valid data to follow, the SYNC DET output of the frame sync detector 350 outputs a pulse to preset the RX bit counter 360 and to reset the BW control Flip-Flop 462. The RX bit counter 360, (a modulo N counter where N, the number of bit transition times within a frame, is 144 in this example) counts the bit times occurring in the transmit and receive windows and applies the count to the receiver state decoder 370. The RX state decoder 370 compares the incoming bit counts to a plurality of thresholds in order to generate the corresponding control signals or masks for the various protocols.

Since noise, unwanted, redundant signals, or any other activity may generate a false time slot for the bit counter 360 to count, corrupt the center reference of the center slicer 331, and/or the AGC circuit within the receiver 320, the control circuitry 400 controls the base system timing to open a receive window only at preselected times so as to reject unwanted signals which are not spaced where the desired data is expected.

Upon initialization of the system, all the receive and detection circuits 320 and 300 are reset. Referring to FIGS. 3-6, the transceiver receive control signal RX CNTL 51 begins toggling to turn the antenna of the base receiver on and off at a rate which is determined by the TDD or other burst protocol used. In this case, the antenna of the receiver is being turned "ON" and "OFF" for one millisecond each as a RX CNTL 51 500 Hz signal.

If MUX3 operation is not being utilized as denoted by a high input to the OR gate 423, the AND gate 432 will be enabled to provide the transceiver receive control signal (RX CNTL) as the output signal to control the operation of the AGC receiver 320.

On the other hand, if MUX3 operation is selected by a low /MUX3 input to the OR gate 423, and a low BW CNTL signal 54 (low for narrowband mode), the MUX3 receive (RX) data mask will be ANDed (432) with the transceiver receive control signal RX CNTL to form a base receive control signal (BRXCT 52), to allow the receiver 320 to be enabled when data is present.

For the data detector and clock recovery device 330, if MUX3 operation is not in use, the transceiver receive control signal RX CNTL, is selected, by the first multiplexer 421 and a low BW CNTL signal 54 (denoting a wideband pulse had enabled an S-R Flip-Flop 462) on the select line to the second multiplexer 422, as the output signal to control the data detector and clock recovery device 330.

Regardless of what protocol is being used, a delay register in the delay circuit 402 is programmed for the appropriate propagation delay in the receiver 320 by a controller or microprocessor (not shown). The transceiver receive control signal RX CNTL is delayed by the delay circuit 402 by the predetermined time interval approximating the propagation delay. If the select line of the first multiplexer 421 is high, denoting a MUX3 operation, the transceiver receive control signal delayed by the delay circuit 402, is provided to the second multiplexer 422.

Thus, for MUX3 operation, the second multiplexer 422 steers the delayed transceiver receive control signal to provide a HOLD signal. This HOLD signal allows the data detector and clock recovery device 330 to still be enabled after the antenna of the receiver 320 has shut down due to the transceiver receive control signal RX CNTL toggling OFF. The HOLD signal then allows the data bits at the antenna 310 to reach the data detector and clock recovery device 330 to prevent the loss of data after synchronization character detection.

The receive detection circuit 300 has no possible way of detecting which of the four submuxes has been detected by the frame synchronization detector 350. However, the receive detection circuit 300 was designed to retrieve data in the same submux s1, s2, s3, or s4, as the current submux where future data was assumed valid because the correct frame synchronization character CHMP has been detected. Therefore, to prevent the frame synchronization character from being detected too early in the base receive time-slot window causing loss of D channel data bits in subsequent fames, the frame sync detector 350 is inhibited from clocking data in until a value in the receiver mask delay circuit 404 expires.

A receive mask register in the receive mask delay circuit 404 is then programmed for a predetermined number of masking bits such as from 0 to 16 bits. This receiver mask delay value governs the number of bits to mask such that if a frame synchronization character is present in the current submux, it will not be detected by the frame sync detector 350 because some of the frame synchronization character bits will be masked and therefore will not be recognized. However, since the receive window is wide enough to accommodate up to two submuxes, if a frame synchronization character CHMP is present in a later occurring submux, it will be detected after the expiration of the mask delay.

Hence, during the initial acquisition of data, that is prior to valid data (frame synchronization character CHMP) being recognized by the sync frame detector 350, the receive mask delay circuit 404 masks the incoming data to prevent the frame synchronization character CHMP in a first occurring submux from being detected until within a later occurring submux. In this manner, if the receive window were to open at the start of the frame synchronization character CHMP, the data bits which are aligned before the frame synchronization character CHMP would not be lost since the receive window would still be opened for those data bits positioned before the later occurring CHMP. In effect, the masking shifts the sampling done during a first occurring submux to one done at the beginning of a later occurring submux.

Accordingly, the receiver mask delay circuit 404 is enabled by the transceiver receive control signal RX CNTL and sets a delay according to the receiver mask delay value programmed by the base controller (not shown). If MUX 3 operation is selected as a low input to an OR gate 429, a low signal for the predetermined number of bits from the receiver mask delay circuit 404 will disable the AND gate 431 from providing the correct frame synchronization character to the sync detector 350 until the receiver mask delay circuit 404 has expired. The first AND gate 431 is then enabled by a high output signal from the receiver mask delay circuit 404 after the receiver mask expiration period to allow the limited data from the data detector 330 to be clocked into the frame synchronization detector 350. On subsequent frames where the received data is assumed valid, the control circuitry 400 will allow the receive detection circuit 300 to be enabled during the desired period of the particular submux.

Referring to FIG. 4, the previous asynchronous mode is now synchronous because of the detection of the frame synchronization character CHMP. The frame synchronization detector 350 determines when valid data has been received and provides a SYN DET pulse when data becomes aligned in a manner that the frame synchronization detector 350 can detect a valid frame synchronization pattern by detecting the correct frame synchronization character CHMP. A pulse output labelled SYNC DET from the frame synchronization detector 350 indicates the detection of the frame synchronization signal which is used to control the receiver bit counter 360 and the bandwidth of the dual bandwidth clock recovery device 332. The SYNC DET pulse from the frame synchronization detector 350 provides an internally generated feedback signal and causes the data detector and clock recovery device 330 to switch from an asynchronous to a synchronous mode. As seen in FIG. 4, the previous wide bandwidth mode of the dual bandwidth DPLL or clock recovery device 332 and the fast time constant mode of the center slicer 331 are simultaneously switched to a narrow bandwidth mode and a slow time constant mode (individually, such as in U.S. Pat. No. 4,575,863 and 4,625,320, both incorporated herein by reference), respectively.

The SYNC DET pulse applied to the R input of the R-S flip-flop 462 resets the R-S flip-flop 462 from the "high" state of the wide bandwidth (previously set by the S input) mode to a "low" state of a narrow bandwidth mode on the Q output labelled BW CNTL 54.

The center slicer 331 is basically a data limiter bias circuit which includes a capacitor 452, a pair of resistors 424 and 426, a pair of transmission gates or switches 441 and 442, and a comparator 434. The combination of parallel resistors 424 and 426 and capacitor 452 form a low pass filter to provide a relatively short time constant for the center slicer 331 when the pair of transmission gate switches 441 and 442 are activated (closed) by a high output from the BW CNTL output of the R-S flip-flop 462 and the delayed transceiver receive control signal providing the HOLD signal (as selected by the high BW CNTL signal for wideband mode in the second multiplexer 422). The capacitor 452 rapidly charges to the average voltage of the received data signal. The junction of the parallel resistors 424 and 426 and the capacitor 452 is then used to set the voltage at the voltage reference input of the comparator or limiter 434.

If the frame synchronization word of word frame sync binary pattern (CHMP) is detected by the frame synchronization detector 350, the switch 441 is deactivated (opened) by the low BW CNTL signal to increase the time constant by removing the parallel resistor 424. The increased time constant prevents reference voltage shifts which could normally occur due to long strings of ones and zero's in a binary signal pattern.

Referring to FIGS. 3-6, the rest of the control circuitry 400 provides a means to control the base receive system to only enable the receiver detecting circuits 300 and the receiver 320 during times when actual assumed valid data is to be retrieved from the received RF signal. After frame synchronization, the low output from the BW CNTL signal 54 also switches the select line of the second multiplexer 422 to a low from a high to cause the output of the receiver decoder 370 to be selected. This output from the receive decoder 370 provides a receive data mask 53, called a HOLD signal (after selection by the multiplexer 422), to provide a high signal, only during the short burst of the particular submux where data is valid. The masked output or HOLD signal originally generated by the receiver decoder 370 is then used to control or enable the data detector and clock recovery device 330 to be active only during that particular submux burst.

Referring to FIG. 4, the low portion of the HOLD signal (provided by a receive data mask output 53 of the second multiplexer 422 selected by the BW CNTL signal being high for the narrow bandwidth mode), occurring when data is not expected, opens the transmission gate switch 442 such that the voltage reference provided by the now floating capacitor 452 is maintained. The incoming limited data is invalid since the proper voltage reference is not provided at the negative input of the comparator 434. Therefore, the low provided on the HOLD signal disables the AND gate 433 from coupling any of this invalid data to the the dual bandwidth clock recovery device DPLL 332 or to the rest of the receive detection circuitry 300 via the "D" terminal of a D Flip-Flop 464. When the HOLD signal is high, the limited data is then bandlimited by the D Flip-Flop 464 for application to the B and D channel buffers 340 and 341 and the SYNC detector 350.

As an example of an internal clock circuit, a programmable fractional bit counter 466 divides a reference clock pulse generated by voltage controlled oscillator (VCO) or the like operating at 2.304 MHz to provide a center bit sampling or reference pulse to a phase detector 467 and to the D Flip-Flop bandlimiter 464. The fractional bit counter 466 is a 5 bit counter which normally divides by 32, but may divide by 30-34. The most significant bit of this counter 466 divides the reference clock pulse to a frequency of 72 kHz. When the most significant bit of this counter 466 is low, it signifies a late window, and when high, it signifies an early window to incoming receive transitions or edges relative to the internal clock. The divided clock signal is also inverted (468) to provide a recovered received clock (REC RX CLK) the Receive Bit Counter 360.

The output of this most significant bit of the counter 466 is fed into the phase detector 467. The phase detector 467 correlates the incoming transitions to this bit. When the bit is in a low state and a transition occurs on the incoming received data, the late flag is set on the output of the phase detector 467. On the other hand, when the bit is in a high state and a transition occurs on the incoming received data, the early flag is set on the output of the phase detector 467. In this way, the phase detector 467 asserts an EARLY signal if the limited data arrives ahead of the center bit sampling reference or a LATE signal if the limited data lags the center bit sampling reference. Because of poor signal quality and group delay within the system, it is possible to have both early and late flags set within the same bit time. However, when both flags are set, the information for the bit is considered invalid and is discarded. This comparison between the incoming transitions and the internal clock provides a bandwidth limit of approximately 36 kHz.

In the wideband mode, as selected by a high Q output from the S-R Flip-Flop 462 for the multiplexer 482 to read the B inputs, the early and late signals or flags out of the phase detector 467 are steered substantially quickly back into the fractional bit counter 466 as B0 and B1 inputs to the multiplexer 482, respectively. If both flags are valid, no adjustment is made by the multiplexer 482 to the counter 466. If the late flag is truly valid, then the counter 466 will advance 2 additional counts, as directed by the multiplexer 482, making the bit time a 34clock period. On the other hand, if the early flag is true, the counter 466 will retard (count less) 2 clocks making the bit time a 30 clock period.

By adding or subtracting to the clock periods, the phase locked loop is being adjusted by 1/16 th (double step size of counter 466) of a bit time. In the worst case scenario (180° out of phase clocks), the phase locked loop would be able to lock within 8 bit transitions or bit times (provided the incoming data was an alternating 1/0 preamble pattern).

In the narrowband mode, as selected by a low Q output from the S-R Flip-Flop 462 for the multiplexer 482, an up/down counter 472 averages the incoming transitions. The up/down counter 472 will be enabled when only one of the two flags (either early or late) out of the phase detector 467 are valid. Thus, the up/down counter 472 is disabled (to maintain the same count) by an EXCLUSIVE OR gate 474 for the invalid case of having both early and late flags or if there are no phase differences. Otherwise, an EARLY signal will cause the U/D counter 472 to count up by one while a LATE signal (no EARLY signal present) will cause the counter 472 to count down by one while the CLR input is low.

Over a period of transitions, the up/down counter 472 will accumulate counts in one direction or sign S (positive or negative) until it reaches a previously determined bandwidth control threshold value stored in a narrow mode bandwidth register. The accumulated counts, including the sign information, of the up/down counter 472 is then converted into an absolute value by a twos complement device 476 before being compared to the bandwidth control threshold value in a comparator 478.

When the absolute and threshold values equal, an advance or retard signal from the multiplexer 482 will control the fractional bit counter 466. The advance or retard signal is determined by the A inputs of the series connected multiplexers 482 and 492. A logic circuitry 484 provides the A inputs for the multiplexer 492, as selected by the transitional mode on the select line, to decode as to whether there were more early or late flags counted during the transitional period (to correspondingly retard or advance the counter 467, respectively). Since the fractional bit counter 466 is programmable, the step size of its adjustment may be varied from the previously set 2 step size to a single step by another input (not shown)into the bit counter 466.

As before, the programmable divider or fractional bit counter 466 adjusts the phase of the recovered clock signal, if needed, by programmably switching a plurality of divide ratios, as instructed by the multiplexer 482. The divider 466 can be switched between divide ratios of 30, 32, or 34 as determined by the control signals ADVANCE, both or no ADVANCE and/or RETARD (no phase difference), or RETARD, respectively for a double step size or ratios of 31,32, or 33 as determined by the control signals ADVANCE, both or no ADVANCE and/or RETARD (no phase difference), or RETARD, respectively for a single step size.

At the time a phase adjustment occurs, the up/down counter 466 is returned or cleared to zero by either outputs from the multiplexer 482 enabling a pair of series connected OR gates 486 and 488 (making the assumption that the phase has been corrected to the incoming frequency). This cycle of up/down counting and clearing is repeated for several hundred milliseconds to allow for stable recovery of the incoming data.

During the establishment of a communication link in the MUX 3 protocol and/or another protocol of the CT2 or other burst mode operation, both wideband and narrowband operation may occur. However, after all the information has been received by both ends of the link, both the base and portable or cordless handset switch into a MUX1 protocol (voice mode) where there is no frame alignment available. Thus, a stable phase locked loop is required to prevent a loss of link due to poor signal quality.

Hence, the digital phase locked loop is now switched into a third mode of operation called the periodic mode (adjustment based on a 2 millisecond period having 1 transmit and 1 receive burst). In this mode, the phase locked loop phase adjusts at the end of the 1 millisecond of receive period.

Within the receive period of the frame, the up/down counter 472 averages all the transitions as before. At the end of the receive period, one of three decisions are made. If the output value of the up/down counter 472 is zero, no adjustment is made.

If the output value from the U/D counter 472 is now zero and the sign S is a positive value, the average is deemed early and 1 count is removed from the fractional bit counter 466. As selected by the periodic mode on the multiplexer 492, the AND gate providing the B1 input is decoded by the multiplexer 492 to generate an early output into the A0 input of the multiplexer 482 to retard the counter 466.

On the other hand, if output value is non-zero and the u/d counter (472) sign S value is negative, the average is deemed late and 1 count is added to the bit counter 472. Correspondingly, the AND gate providing the B0 input is decoded by the multiplexer 492 to generate a late output into the A1 input of the multiplexer 482 to advance the counter 466. This minimum adjustment prevents the receive system from rapidly drifting off frequency due to poor signal quality or a low frequency content in the incoming data.

According to the invention, during initial acquisition of the data (i.e. prior to valid data being detected at the frame sync detector 350) the receive bit counter 360 is not aligned. The high to low transitional SYNC DET output of the frame sync detector 350 also causes the receive bit counter 360 to be initialized to align its count based on when the frame synchronization character or pattern had occurred in order to retrieve the total predetermined number of valid bits of the received signal (i.e. SYNCD and ACW) after the frame synchronization character (CHMP). If the frame synchronization character were to be aligned with the beginning of the receive window, without masking, the receive bit counter 360 would not be able to initialize and align its count previous to when the frame synchronization pattern is expected, in order to capture all of the periodically leading D data bits. However, with the frame synchronization character being aligned at a later time in the receive window, the count can start somewhere after the receive window but still early enough to capture all the D data bits.

The receiver bit counter 360 then counts until it reaches a predetermined number which denotes the beginning of when the next data will be allowed to arrive, taking into account the leading periodic occurrences of the D data bits relative to this frame synchronization character CHMP. When the next data arrive, all the receive and data detection circuits 320 and 300 are enabled by the masked output or HOLD signal originally provided by the decoder 370.

After the detection of the frame synchronization character CHMP, the SYNC DET pulse output from the frame synchronization detector 350 removes the effect of the receiver mask delay circuit 404 for the rest of the detection operation since subsequent valid data will be coupled to the buffers 340 and 341 (sync enabled) instead of the frame sync detect 350. The data detector 330 will then begin to clock in data during the appropriate submux within the reduced receive window. It is to be noted that the data detection circuitry of the present invention need not work only with (but can work independently of) an AGC receiver such as the zero IF receiver.

Furthermore, the low output signal from the BW CNTL signal 54 also provides a low signal to the OR gate 423 to cause the base receive control BRXCT signal 52 to be provided by the transceiver receiver control signal RX CNTL 51 ANDed (432) with the MUX3 RX data mask signal to deactivate and store (552) the AGC circuit activity in the receiver 320 when valid data is not expected. This same base receive control signal BRXCT allows the RF receiver 320 to be enabled only when valid data is present (only within the receive and not the transmit portion of the protocol), namely, the correct submux of the frame. As provided by the receive decoder 370, the MUX3 receive data mask signal is low during the time the cordless handset would be receiving or transmitting non-aligned submux data since only the time when valid data is anticipated (aligned) is the MUX3 RX data mask signal high.

A problem which can delay the proper reception of signals just after the transition of transmit to receive mode is caused by the AGC (automatic gain control) which is necessary because of the active filters used in the receiver. If the AGC voltage is allowed to decay in the transmit mode, then proper reception will be delayed by the AGC attack time when returning to the receive mode. The invention prevents this intolerable effect, along with other problems, by the addition of several transmission gate switches as shown in FIG. 5.

Referring to FIG. 5, the receiver 320 includes series switches 451–454 at both the inputs and the outputs of the baseband lowpass filters 520 and 524, switches 455 and 456 from the inputs of filters 520 and 524 to analog ground, and a switch 461 between the demodulator 540 and the postdemodulation low pass filter 542. These switches (except 455 and 456) are normally closed in the receive mode. The base transceiver 100 also includes the antenna 310 coupled to the transmit/receive switch 325. When the transceiver is in the transmit mode, a conventional transmitter 550 is coupled to the antenna 310; and when it is in the receive mode the receiver portion is coupled to the antenna 310. The BRXCT signal 52 controls the selective opening and closing of the switches 451–457 in the receiver 320.

When going to the transmit mode and when valid data is not expected, the switches 451–454 are opened to prevent any DC shifts from propagating through the baseband path. However, since the baseband filters 520 and 524 have a certain time delay, it is necessary to delay (562) the opening of the switches 453 and 454 at the end of a receive period to allow any signal which has just entered the baseband path to propagate through the filters and the up-conversion path. In addition to the series switches, shunt switches 455 and 456 are placed at the outputs of the down-conversion mixers 516 and 518 which connect the mixer outputs to analog ground when in the transmit mode or when valid data is not expected. This prevents a long recovery time in the mixer output circuit (which acts as a current sink) which may take place if the mixer outputs are allowed to float to their maximum or minimum voltage levels.

The transient disturbance at the output of the demodulator 540 is minimized by adding a series transmission gate switch 461 at the input to the post demodulation filter 542. The filter 536 is thus left in its normal quiescent state while the transmit mode is engaged, and the filter 536 can begin responding to the demodulated signal output without the need to traverse from a maximum or minimum output condition when the receive mode is entered.

In addition, the AGC control voltage is held during the transmit period and during the time when valid data is not expected, insuring that proper receiver gain is achieved immediately upon return to the receive mode when valid data is expected in the particular submux. The switch 457 selectively couples and decouples the supply voltage reference REF to the supply terminal of the preamplifier 312. An AGC capacitor 552 is disposed between the supply terminal of the preamplifier 202 and ground. Switches 458 and 459 are normally closed (in the receive mode during the particular submux) while the switch 457 is normally open. During the transmit mode and when valid data is not expected, switches 458 and 459 are open, effectively holding whatever control voltage happens to be present on the AGC capacitor 552. The switch 457 is closed during transmit and when valid data is not expected, forcing the preamplifier 312 into its minimum gain mode to isolate the down-mixers 516 and 518 from potentially high levels of RF which might otherwise get through the preamplifier 312 and cause transients. The two switches 458 and 459 are used instead of a single switch in series with the AGC capacitor 552 in order to prevent an AC voltage from developing at the preamplifier AGC input. This AC voltage would be caused by a ripple current which flows from an AGC detector 560 into the AGC capacitor 552. With the configuration shown, no AC current flows through the switch 458 and the AGC control voltage is equal to the capacitor (552) voltage.

In this manner, by disabling the receiver 320 during the four milliseconds idle period of the handset's transmit and only enabling it during the appropriate submux, the AGC control internal to the receiver 320 and bit synchronization within the detection circuitry 300, is maintained without contamination or disturbances from transients or other interferences present when the signal is not desired anyway. This reduced receive window prevents the AGC and bit re-acquisition before reliable data is again detected. The radio receiver 320 and the data detector and clock recovery device 330 will then stay in this synchronous status or reduced received sampling window until all submux data is decoded or the base receive system is re-initialized.

In summary, to compensate for the propagation delay in the RF base receiver, the operation of the data detector is delayed. To prevent loss of data on subsequent frames where the data is not aligned with the frame synchronization character, a programmable mask delay function prevents the frame synchronization detector from receiving the frame synchronization data for a predefined period after the receiver is enabled. Prior to this detection of the frame synchronization pattern, the receiver is controlled to toggle "On" and "Off" for equal periods. However, after the detection of the frame synchronization pattern, all the receive circuitry, including the RF receiver and the detection circuitry, are controlled by a reduced receive window set by a decoder to form a reduced receiving time slot centered around the particular submux where the frame synchronization was found. In addition, after the frame synchronization pattern is detected, the AGC system is controlled to operate only when RF energy is present and valid data is expected at the particular submux. Especially for Zero Intermediate Frequency (ZIF) base receiver operation which require AGC stabilization before the modulated data is valid, enabling the receiver "On" only during the submux where RF energy is present and valid, eliminates the need for AGC re-acquisition and enhances the probability of detecting a good synchronization code word.

What is claimed is:

1. A receive detection circuit, comprising:
    an adaptive data limiter, for receiving a demodulated data signal and providing a limited data bit stream having a frame sync pattern and a digital data message apportioned into a particular submux of a receiving time-slot, the adaptive data limiter also providing a plurality of time constants which are programmably controllable in response to the demodulated data signal and providing a time constant switchable from a relatively short time constant to a relatively long time constant when enabled, the adaptive data limiter also including time constant enabling means for switching the time constant of the adaptive data limiter, to the relatively long time constant, when the end of the frame sync pattern is detected;
    detecting means for detecting, during the particular submux, the end of the frame sync pattern followed by the digital data message in the limited data bit stream;
    phase-locked loop means, providing clock recovery to the limited data bit stream, including:
    a plurality of tracking bandwidths which are programmably controllable in response to the limited data bit stream for providing a bandwidth switchable from a relatively wide bandwidth to a relatively narrow bandwidth when enabled;
    bandwidth enabling means for switching the bandwidth of the phase-locked means, to the relatively narrow bandwidth, when the end of the frame sync pattern is detected; and
    control means for simultaneously switching the adaptive data limiter time constant from the relatively fast time constant to the relatively slow time constant and the phase-locked loop bandwidth from a relatively wide bandwidth to a relatively narrow bandwidth in response to the detection of frame sync pattern.

2. A receive detection circuit as described in claim 1, further comprising a switchable gate means for coupling the limited data bit stream from the adaptive data limiter to the phase-locked loop means when the limited data bit stream is expected during the particular receiving time slot.

* * * * *